Figure 1:
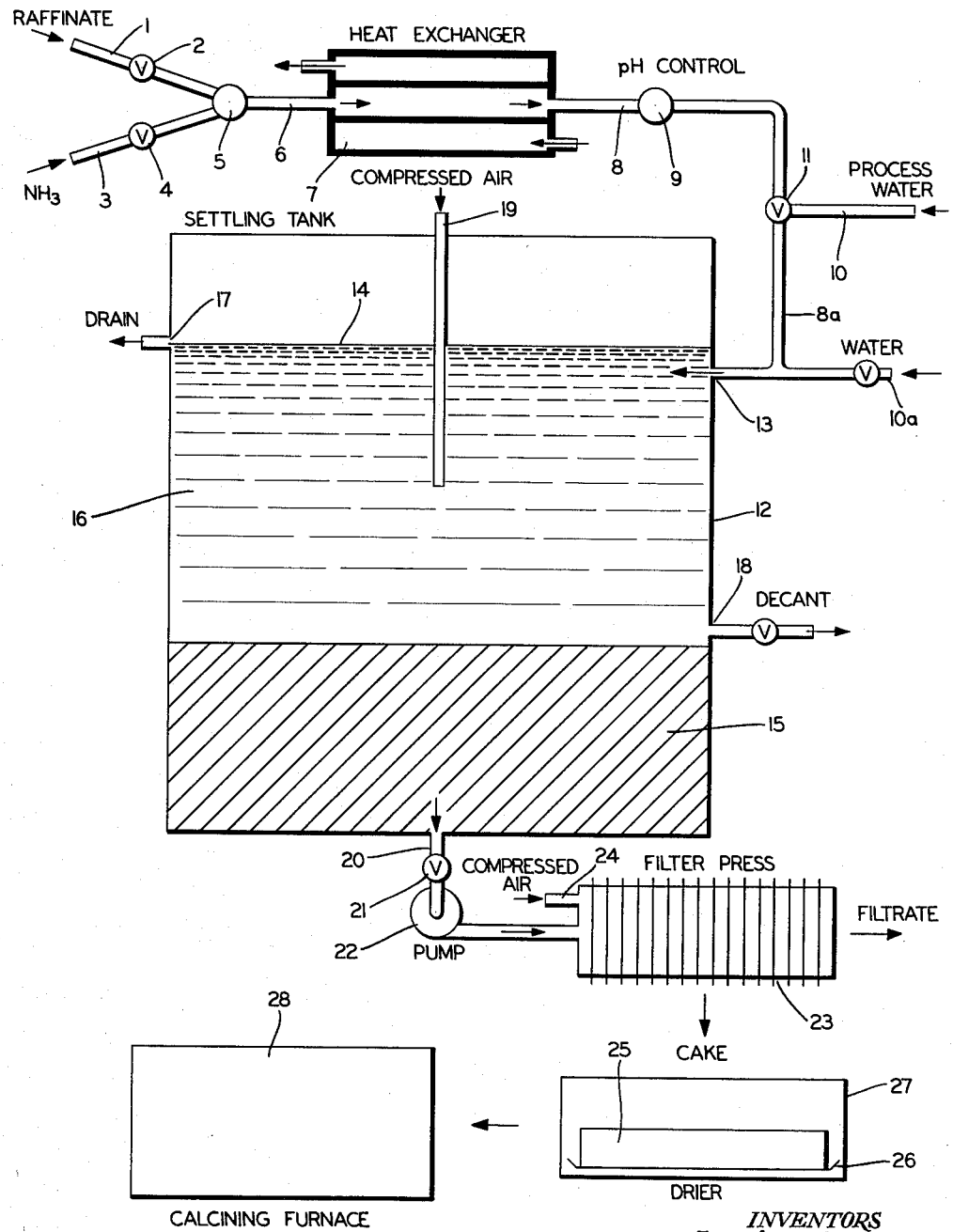

INVENTORS
Irwin J. Groce,
Robert W. Ritchey and
Russell W. Peters
BY
Frease, Bishop, Johns & Schick
ATTORNEYS

United States Patent Office

3,098,711
Patented July 23, 1963

3,098,711
RECOVERY OF HAFNIUM HYDROXIDE
Irwin J. Groce, Robert W. Ritchey, and Russell W. Peters, Ashtabula, Ohio, assignors, by mesne assignments, to National Distillers and Chemical Corporation, a corporation of Virginia
Filed Aug. 24, 1959, Ser. No. 835,540
4 Claims. (Cl. 23—140)

The invention relates to the recovery of hafnium hydroxide and more particularly to such recovery from hafnium raffinate containing hafnium in the form of hafnyl sulphate, together with excess sulphuric acid, as obtained from organic phase separation of hafnium from zirconium, by neutralizing the hafnium raffinate with ammonia in stream and accurately controlling the pH value low in the alkaline range, yielding a filterable precipitate of hafnium hydroxide.

In the process of preparing zirconium metal suitable for preparation of reactor grade quality zirconium, it is known that normally contained hafnium which occurs with zirconium in nature in almost all ores in varying proportions must be removed to an extremely low level to give satisfactory zirconium material. One of the processes for accomplishing this objective involves the liquid liquid extraction of zirconium from hafnium using a Hexone-thiocyanate extraction system to effect the separation.

This mode of separation was developed by the Atomic Energy Commission at Oak Ridge National Laboratories and has been disclosed in A.E.C. reports Y 431, Y 477 and Y 480. This process essentially involves the treatment of zirconyl chloride solutions (containing hafnyl) in a liquid liquid extraction system containing thiocyanate ion in contact with methyl isobutyl ketone (Hexone).

In the conduct of such extraction, the zirconyl component tends to remain in the aqueous phase and is removed as an aqueous zirconium raffinate. The hafnium values tend to concentrate in the organic phase and are removed as an organic extract. Complete removal of the zirconium values from this extract is effected by countercurrent scrubbing with hydrochloric acid. The organic hafnium extract is then scrubbed with aqueous sulphuric acid to remove the hafnium as an aqueous hafnium raffinate which becomes the raw material for subsequent processing to produce a pure hafnium metal compound.

This hafnium raffinate may have the following approximate composition:

| | Parts by weight |
|---|---|
| Hafnyl sulphate | 10.1 |
| Sulphuric acid | 643.2 |
| Thiocyanic acid | 15.5 |
| Water | 2365.2 |
| Ketone | 40.2 |

The composition given above may vary considerably, depending upon the conduct of the extraction process, but it normally contains a large excess of sulphuric acid relative to the hafnium concentration. The hafnium values in this raffinate are recovered by precipitating the hafnium as the hydroxide by the addition of any alkali. Ammonia is preferred since it adds no involatile residue which would contaminate the hafnium.

According to prior practice, this hafnium raffinate was mixed with ammonia in stream to neutralize the raffinate, and the combined stream was passed through a heat exchanger and introduced directly into an agitated tank, from which the precipitate was pumped to a filter press. The precipitate comprised such a slimy, soft, gelatinous gel that the filter operation was extremely ineffiecient and there was only a recovery of approximately 15% of the hafnium value.

We have discovered that by the addition or modification of certain steps to this process, particularly an accurate control of the pH value of the combined raffinate and ammonia stream, and a washing and agitation of the precipitate in the settling tank, the recovery of the hafnium value is increased many fold.

It is therefore a primary object of the invention to provide a novel method and apparatus for the recovery of hafnium hydroxide from hafnium raffinate containing hafnium salts such as hafnyl sulphate, together with excess sulphuric acid.

Another object of the invention is to provide such a method and apparatus for recovering a large majority of the hafnium value in the precipitate from neutralized hafnium raffinate.

A further object of the invention is to provide for accurate control of the pH value just above the neutral 7 value and low in the alkaline range, of a stream of hafnium raffinate neutralized with ammonium hydroxide.

A still further object of the invention is to provide for diluting the combined stream of hafnium raffinate and ammonium hydroxide with preferably an equal amount of water to reduce the initial concentration of ammonium sulfate salt and thus cause the hafnium hydroxide precipitate to easily settle.

It is also an object of the invention to provide for decanting nearly all of the clear supernatant from the tank of initially settled hafnium hydroxide precipitate, and for replacing the supernatent with clear water and agitating the resulting contents of the tank to wash the precipitate.

Furthermore, it is an object of the invention to provide apparatus whereby the process of recovering hafnium hydroxide from hafnium raffinate may be carried out in a continuous operation.

It is finally an object of the invention to improve the method and apparatus for recovering hafnium hydroxide from hafnium raffinate whereby the recovery of hafnium values is greatly increased.

The above and other objects, apparent from the drawing and following description, may be attained, the above described difficulties overcome and the advantages and results obtained, by the apparatus, constructions, arrangements, methods, steps, procedures, modes of operation, combinations, subcombinations and parts which comprise the present invention, a preferred embodiment of which, illustrative of the best mode in which applicants have contemplated applying the principle, being set forth in detail in the following description and illustrated in the accompanying drawing.

In general terms, the invention may be described as including means for mixing a hafnium raffinate stream with aqueous ammonium hydroxide, in stream, and passing the combined neutralized stream through a heat exchanger for cooling. A pH control head is located just beyond the heat exchanger for providing accurate pH control of the combined stream just above the neutral value of 7 and low in the alkaline range. This location of the heat exchanger just prior to the pH control head provides for more accurate pH control and also stops thermal currents in the subsequent settling tank.

The cooled, neutralized stream then is diluted in line with preferably about an equal amount of cool process water to reduce the initial concentration of ammonium sulfate salt in the stream, so that the precipitate will more easily settle. The cooled, diluted stream then flows into the upper portion of a settling tank provided with an overflow to drain at a point slightly above the inlet.

After the settling tank is filled, the precipitate is allowed to settle in the bottom of the tank and excess supernatant overflows at the top to waste. When a sufficient amount of precipitate has settled to and accumulated at the bottom of the tank, the tank is decanted to remove as much as possible of the clear supernatant at a point just above the top level of the settled precipitate.

Water then is added to the tank to replace the decanted supernatant, and the precipitate is washed with such water by agitating the contents of the tank, preferably by compressed air introduced through a pipe with an outlet submerged below the water level. The washed precipitate is then pumped to a filter press for recovery. The tank is again allowed to settle, and the clear supernatant is drained from the tank preparatory to adding material from a cooled, neutralized, diluted stream for the next batch.

When the filter press is full, the precipitate cake therein is blown with air to remove as much liquid as possible. The precipitate cake is then removed from the filter press and placed on a tray and put into a dryer. The dried cake is then placed in a calcining furnace and calcined, providing substantially pure hafnium oxide.

Figure 2:
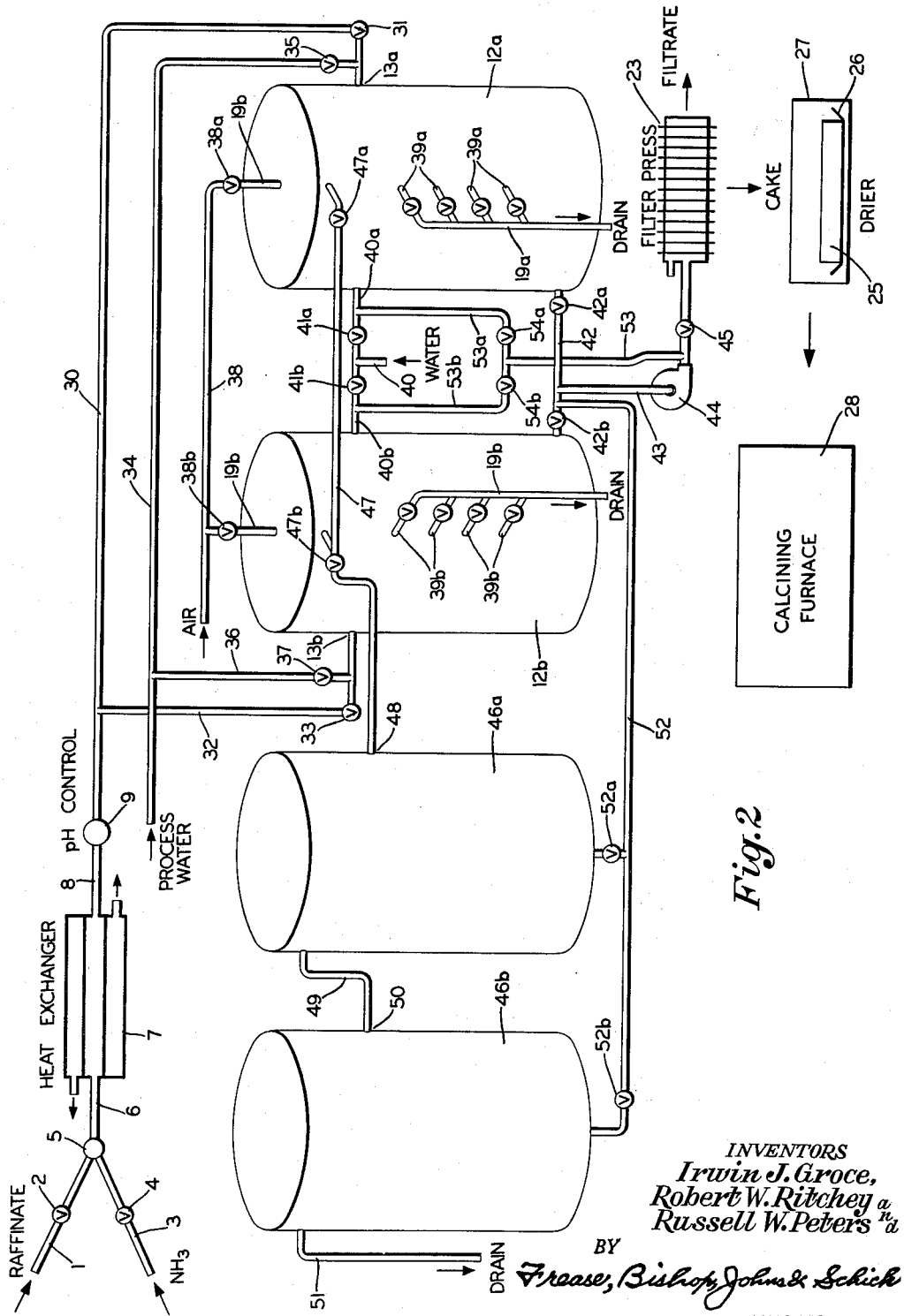

Reference is now made to the accompanying drawings showing a preferred embodiment of the invention; in which, FIG. 1 is a diagrammatic sectional elevational of apparatus for carrying out the process to which the invention pertains; and FIG. 2 is a diagrammatic view of an arrangement of the apparatus for carrying out the process as a continuous operation.

Referring first to the improved process as carried out in the apparatus shown in FIG. 1, in which similar reference characters refer to similar parts throughout—hafnium raffinate containing hafnium in the form of hafnium salts such as hafnyl sulphate, together with excess sulphuric acid, as obtained from organic phase separation of hafnium from zirconium, is conveyed to the recovery apparatus through pipe 1 having a control valve 2 therein. Aqueous ammonium hydroxide is fed through pipe 3, having a control valve 4 therein, and is mixed in stream with the raffinate at 5.

The neutralized stream is fed through pipe 6 to a heat exchanger 7, where it is cooled, and then is fed through pipe 8 to and through a pH control head 9, which accurately controls the pH value of the combined, cooled stream. One or the other of valves 2 and 4 is controlled by the pH control head 9 to admit the proper proportions of raffinate and ammonium hydroxide to obtain and maintain the desired pH value.

The pH value is preferably accurately controlled low in the alkaline range just above the neutral value of 7 and between 8.0 to 8.5. The neutralized stream is cooled in heat exchanger 7 just ahead of the pH control head 9 in order to provide for more accurate pH control and also to stop thermal currents in the subsequent settling tank.

Cool process water from water supply pipe 10 is admitted to the cooled, neutralized, controlled pH stream, through control valve 11, diluting the cooled stream in line with preferably about an equal amount of process water to reduce the initial concentration of ammonium sulfate salt in order to cause the hafnium hydroxide precipitate to more readily settle. It has been found that without this water dilution the precipitate does not easily settle.

The cooled, diluted stream is then conveyed through pipe 8a to the upper portion of the settling tank 12, and introduced therein at 13, and the tank is filled to the level 14. The hafnium hydroxide precipitate indicated at 15 is allowed to settle to the bottom of the tank, and any surplus clear supernatant 16 overflows at the drain 17 to waste.

When a sufficient amount of precipitate 15 has accumulated in the bottom of the tank 12, as much as possible of the clear supernatant is decanted at 18, from just above the top of the precipitate level in the tank 12. Clear water is then added to the settling tank 12, through the water supply pipe 10a and inlet 13, until the tank is again filled with clear water to the level 14.

The precipitate is then washed by agitating the contents of the tank as by introducing compressed air into the tank through the pipe 19 at a point below the level 14 of the water in the tank 12.

The hafnium hydroxide precipitate 15 is pumped from the bottom of the tank through the discharge pipe 20, in which the valve 21 is opened, as by the pump 22, which may be a centrifugal pump, to the filter press 23. When the tank 12 is pumped empty, it is ready to repeat the cycle by receiving hafnium raffinate and ammonia as above described.

When the filter press is full, the precipitate cake therein is blown with air, as by the compressed air pipe 24, to remove as much liquid as possible from the precipitate. The filtrate is thus removed from the filter press and the cake, indicated at 25, is placed upon a tray 26 and put in the dryer 27 where it is dried for a desired period which may be approximately 10 hours.

The dried cake is then removed from the dryer and placed in a calcining furnace 28 and calcined, producing substantially pure hafnium oxide for subsequent processing of the pure hafnium metal compound.

In FIG. 2 is shown an arrangement of the apparatus in which the above described process may be carried out as a continuous operation. The piping for mixing raffinate and alkali in stream, the heat exchanger, pH control, filter press, dryer and calcining furnace may all be as illustrated in FIG. 1 and above described, and those parts are indicated by the same reference numerals as in FIG. 1.

For the purpose of carrying on the process continuously, two alternate settling tanks are provided, as indicated at 12a and 12b, each of these tanks being substantially the same as the settling tank 12 illustrated in FIG. 1 and described above in detail.

The cooled, neutralized, controlled pH stream may be conveyed from the pH control 9 through pipe 30, having valve 31 therein, to the upper portion of the settling tank 12a, as at 13a, or alternately, may be conveyed through the pipe 32, having valve 33 therein, to the settling tank 12b, as at 13b. Process water from the pipe 34, having valve 35 therein, may be mixed with the cooled, neutralized, controlled pH stream to the settling tank 12a, or alternately through the branch pipe 36, having valve 37 therein, may be mixed with the stream to the tank 12b.

Compressed air from pipe 38 may be alternately admitted to the upper end of settling tank 12a or 12b, through the pipes 19a or 19b, by operation of the valves 38a and 38b. Supernatant may be decanted from the settling tanks 12a or 12b through the pipes 19a or 19b.

In order that the supernatant may be decanted from any one of several levels in the tanks 12a and 12b, a plurality of valve controlled outlets from each of the tanks, as indicated at 39a and 39b, communicate with the drain pipes 19a and 19b. In order that the level of the precipitate in the settling tanks 12a and 12b may be easily determined, the drain pipes 19a and 19b are preferably formed of glass or othehr transparent material.

Additional water, for washing, may be admitted to the upper ends of the tanks 12a and 12b from the water pipe 40, at 40a or 40b, by operation of the valves 41a and 41b. A precipitate discharge pipe 42, controlled by valves 42a and 42b, communicates with the lower ends of the alternate settling tanks 12a and 12b, and communicates through pipe 43 with the pump 44, which may be a centrifugal pump, for pumping precipitate to the filter press 23 when valve 45 is open.

For the purpose of recovering an additional percentage of the hydroxide, two additional settling tanks 46a and 46b may be provided, and connected in series with each other and with the alternate settling tanks 12a and 12b. This connection comprises an overflow pipe 47, communicating with the upper ends of the tanks 12a and 12b through valves 47a and 47b, and discharging into the upper portion of the additional tank 46a at 48. Overflow pipe 49 discharges from the top of the tank 46a into the upper portion of tank 46b at 50, and overflow pipe 51 discharges from the top of the tank 46b to drain.

A precipitate discharge pipe 52, provided with valves 52a and 52b, communicates with the lower ends of the additional tanks 46a and 46b, and leads to the precipitate discharge pipe 42, from the alternate tanks 12a and 12b. Pipe 53 leads upward from the discharge side of the pump 44 and is connected by branch pipes 53a and 53b, having valves 54a and 54b therein, to the upper portion of the alternate tanks 12a and 12b at 40a and 40b.

In the operation of the apparatus shown in FIG. 2, for continuously carrying on the process, assuming the two alternate settling tanks 12a and 12b and the two additional settling tanks 46a and 46b to all be empty, in order to start the continuous process, the valve 47a from the top of the alternate tank 12a to the overflow line 47 is opened and the valve 47b from the top of the alternate tank 12b to said overflow pipe is closed.

The valve 31 in pipe 30 and the valve 35 in the process water pipe 34 are opened so that the cooled, neutralized, controlled pH stream may be conveyed from the pH control 9 to the upper portion of the alternate setting tank 12a. This stream continuously runs into the tank 12a until the same is filled, after which it overflows through pipe 47 to the additional settling tank 46a and after the same is filled, overflows through pipe 49 to the additional settling tank 46b.

As soon as liquid starts to overflow from the additional tank 46b at 51, the valves 31 and 35 are closed and the valves 33 and 37 are opened so that the cooled, neutralized, controlled pH stream and process water are then admitted to the alternate settling tank 12b.

In actual practice, assuming that each of the four settling tanks is of 5,000 gallon capacity, it may require about two days to fill the tanks 12a, 46a and 46b. These tanks are then permitted to settle for about four hours, during which time the stream continues to flow into the tank 12b.

The supernatant is then decanted from the tank 12a, from just above the level of the precipitate therein, through any one of the outlets 39a, to drain. The tank 12a is then refilled with water from the pipe 40 through the inlet 40a, and then blown with air through the air pipe 19a to wash the precipitate.

After again settling for three or four hours, the tank 12a may be again decanted from just above the precipitate level, through the desired outlet 39a, to drain.

The valves 42a and 45 are then opened and the precipitate is pumped from the bottom of the tank 12a through the pipe 42 and 43 and pump 45 to the filter press 23 where the cake is formed and then dried in the drier 27 and calcined in the calcining furnace 28 as above described with reference to FIG. 1.

The settled contents of the additional tanks 46a and/or 46b may from time to time be pumped through the pipes 52 and 43, pump 44 and pipe 53 and/or 53 and 53b to the alternate tanks 12a and/or 12b, whichever may be empty at the time, and precipitate allowed to settle in said tank or tanks, after which the supernatant is decanted.

This provides for an additional recovery of precipitate which would otherwise be lost if the alternate settling tank 12a and 12b were overflowed to drain. After the alternate tank 12b becomes filled, the overflow will pass to the tanks 46a and 46b as above described while the above described process of settling, decanting and washing, again decanting, etc. is carried out with respect to the alternate tank 12b, the tank 12a will again be filled as above described and the process continued.

With the above procedure, an average of about 85% recovery of hafnium value is obtained, as compared with 15% recovery under prior practice. Hafnium hydroxide precipitate produced using the method of the invention is not slimy and gelatinous, as in prior practice, and provides for an extremely efficient filtering operation.

The above described sequence of operations provides sufficient dilution and washing to remove the salts and water from the original gel structure. The presence of excess ammonium salts throughout precipitation and filtration in the prior practice apparently acted as a peptizing agent. Until the discoveries of the invention were made this was not known since it was not expected that highly ionized ammonium salts would have such peptizing action.

The control of the pH value of the combined raffinate-alkali stream to have a value just above neutral and low in the alkaline range of from 8 to 8.5 is important since if the stream has too high alkalinity a peptizing action may take place.

Accordingly, the improved method and apparatus of the present invention solves a serious low hafnium recovery problem in the art, provides for the recovery of about 85% of the hafnium value in the form of hafnium hydroxide from hafnium raffinate, provides for the accurate control of the pH value low in the alkaline range of a stream of hafnium raffinate neutralized with an alkali, provides for diluting the neutralizing stream to reduce the initial concentration of alkali salt and avoid a peptizing action, provides for washing hafnium hydroxide settled as precipitate from the neutralized stream, provides hafnium hydroxide precipitate which is readily filterable to obtain a high hafnium value recovery, and eliminates difficulties heretofore encountered in the recovery of hafnium hydroxide from hafnium raffinate containing hafnium salts with an excess of sulphuric acid.

In the foregoing description certain terms have been used for brevity, clearness and understanding, but no unnecessary limitations are to be implied therefrom beyond the requirements of the prior art because such words are used for descriptive purposes herein and not for the purpose of limitation and are intended to be broadly construed.

Moreover, the invention is not limited to the exact details and proportions stated because the procedure may be controlled in the manner indicated with variations in the amount of dilution of the neutralized stream and of the time and amounts of washing of the precipitate depending upon the volume of material treated and the size of treatment tanks. Furthermore, it is to understood that more than one settling tank may be used and the diluted stream introduced alternately or successively into various settling tanks.

Having now described the features, discoveries and principles of the invention, the characteristics and operation of the improved method and apparatus, and the advantageous, new and useful results obtained thereby; the new and useful methods, steps, procedures, treatments, apparatus, combinations, subcombinations, parts and elements, and reasonable mechanical equivalents thereof, obvious to those skilled in the art, are set forth in the appended claims.

I claim:

1. A method for recovering hafnium hydroxide from a hafnium raffinate containing hafnyl sulfate and an excess of sulfuric acid which comprises neutralizing said raffinate with ammonium hydroxide to a pH between about 7 and 8.5, cooling said neutralized raffinate, adding about an equal amount of water to said cooled raffinate, settling a hafnium hydroxide precipitate out of said raffinate, decanting supernatant liquid from said precipitated hafnium hydroxide, washing the precipitate with water, and then recovering said precipitate hafnium hydroxide.

2. The method of claim 1 wherein said pH is within the range of about 8 to 8.5.

3. The method of claim 1 wherein said recovered hafnium hydroxide precipitate is filter pressed.

4. A method for recovering hafnium hydroxide from a hafnium raffinate containing hafnyl sulfate and an excess of sulfuric acid which comprises adding ammonium hydroxide to the raffinate in an amount sufficient to obtain a pH within the range of about 8 to 8.5, cooling the thus treated raffinate, adding about an equal amount of water to said cooled raffinate, settling a hafnium hydroxide precipitate out of said raffinate, decanting supernatant liquid from said precipitate, washing said precipitate with water, and then recovering said hafnium hydroxide precipitate.

References Cited in the file of this patent

UNITED STATES PATENTS

| | | |
|---|---|---|
| 1,307,881 | Rosenhain et al. | June 24, 1919 |
| 2,513,562 | Holuba | July 4, 1950 |
| 2,566,665 | Huffman et al. | Sept. 4, 1951 |
| 2,762,756 | Kinnaird | Sept. 11, 1956 |
| 2,867,588 | Keith et al. | Jan. 6, 1959 |

OTHER REFERENCES

Sidgwick: "The Chemical Elements and Their Compounds," vol. 1, Oxford Univ. Press, London, 1950, pages 646–648.

Larsen et al.: "Journal of American Chemical Society," vol. 72, August 1950, pages 3615–3619.

Peterson: "Chemical Abstracts," vol. 51, 1957, pages 13627–13629.